United States Patent
Amitani

(10) Patent No.: US 7,370,341 B2
(45) Date of Patent: May 6, 2008

(54) DISK DRIVING APPARATUS AND METHOD OF MANUFACTURING THE SAME

(75) Inventor: Yosuke Amitani, Saitama (JP)

(73) Assignee: Pioneer Corporation, Tokyo (JP)

( * ) Notice: Subject to any disclaimer, the term of this patent is extended or adjusted under 35 U.S.C. 154(b) by 382 days.

(21) Appl. No.: 11/083,962

(22) Filed: Mar. 21, 2005

(65) Prior Publication Data

US 2005/0210482 A1 Sep. 22, 2005

(30) Foreign Application Priority Data

Mar. 22, 2004 (JP) ............................ P2004-083434

(51) Int. Cl.
*G11B 33/08* (2006.01)
(52) U.S. Cl. ...................... 720/692; 720/651; 720/694
(58) Field of Classification Search ................ 720/651, 720/692–694, 698
See application file for complete search history.

(56) References Cited

U.S. PATENT DOCUMENTS 4,325,133 A * 4/1982 Reitmayer ............... 369/263.1
6,169,718 B1 * 1/2001 Matusi ....................... 720/657
6,178,156 B1 * 1/2001 Kuwajima et al. .......... 720/694
6,381,091 B1 * 4/2002 Takizawa et al. ........ 360/97.01
6,785,217 B1 * 8/2004 Kao et al. ................... 720/651
6,834,393 B2 * 12/2004 Akimaru et al. ............ 720/698
2003/0231575 A1 * 12/2003 Hong et al. ................. 369/263

FOREIGN PATENT DOCUMENTS

DE          19850248 A1 *  8/1999
JP          A-11-328944      11/1999

* cited by examiner

*Primary Examiner*—William J Klimowicz
(74) *Attorney, Agent, or Firm*—Drinker Biddle & Reath LLP

(57) ABSTRACT

A disk driving apparatus includes a base chassis which mounts thereon a spindle motor to rotatably drive a disk, and a pickup device to at least record information on or reproduce information from the disk rotated by the spindle motor while moving in a radial direction of the disk. Preferably, the base chassis includes a plurality of dynamic vibration absorbers each having an elastic member fixed to the base chassis and a dynamic vibration absorption pendulum plate supported by the chassis through the elastic member, and the plurality of dynamic vibration absorbers have different resonance frequencies each other within a frequency range of vibration of the base chassis which is generated in a utilized rotation speed range of the spindle motor.

7 Claims, 8 Drawing Sheets

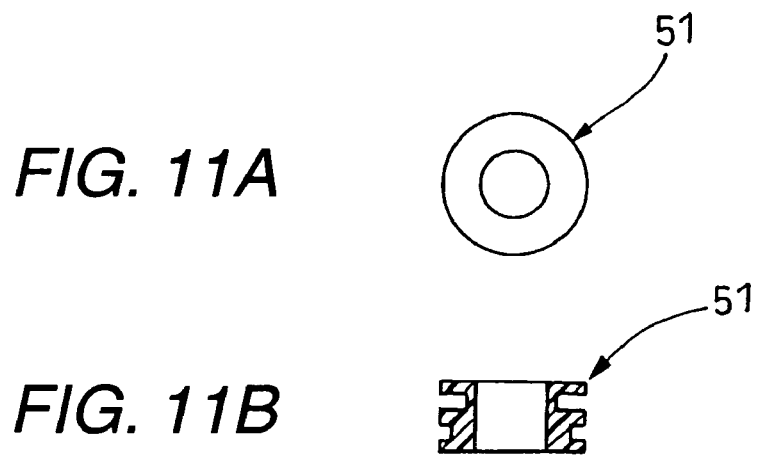
FIG. 11A
FIG. 11B
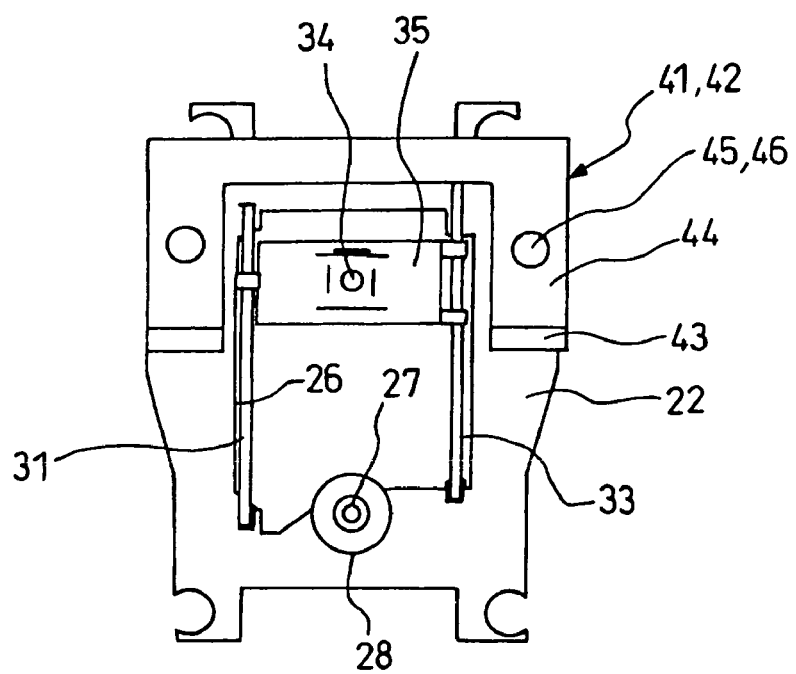
FIG. 12

DISK DRIVING APPARATUS AND METHOD OF MANUFACTURING THE SAME

BACKGROUND OF THE INVENTION

1. Field of the Invention

The present invention relates to a disk driving apparatus and a manufacturing method thereof.

2. Description of the Related Art

A disk driving apparatus, which rotates and drives an optical disk to record and reproduce information on and from the optical disk, is required to accurately record and reproduce information while suppressing vibration generated during the driving operation of the disk.

Conventionally, there has been proposed a disk driving apparatus which is provided with a structure for reducing the vibration during the driving operation of the disk (see JP-A-11-328944, for example). The disk driving apparatus described in JP-A-11-328944 is shown in FIGS. 1 and 2.

The disk driving apparatus shown in FIGS. 1 and 2 includes a main frame 3 supported by a casing 2 through a member 1. The main frame 3 includes a spindle motor 5 for rotating a turn table 4 to which an optical disk D is fixed. The main frame 3 further includes a stepping motor 7 for reciprocally moving a pickup device 6 in the radial direction with respect to the optical disk D which rotates together with the turn table 4. The pickup device 6 moves in the radial direction with respect to the optical disk D being rotated to record and reproduce information. A sub-frame 9 is attached on the upper surface of the main frame 3 through elastic members 8, whereby vibration generated at the main frame 3 is transmitted to the sub-frame 9 through the elastic members 8.

According to the disk apparatus configured in this manner, although the vibration transmitted to the main frame 3 from the casing 2 is attenuated by the member 1, the vibration generated by the rotation of the spindle motor 5 is directly transmitted to the main frame 3. In particular, the vibration due to the imbalance of the optical disk D rotating together with the turn table 4 is likely generated at the main frame 3.

In the disk apparatus 1, since the sub-frame 9 has a resonance frequency vibrating at a phase in opposite to that of the main frame 3, the vibration of the main frame 3 is cancelled by the vibration of the main frame 3 and so the vibration of the sub-frame 9 is reduced near the resonance frequency.

The frequency of the sub-frame 9 vibrating at the phase in opposite to that of the main frame 3, that is, the resonance frequency of a dynamic vibration absorber constituted by the sub-frame 9 and the elastic members 8 is mainly determined by the masses and rigidities of the sub-frame 9 and the elastic members 8. Thus, of the vibrations generated at the time of the recording and reproduction of a disk, only vibration near a particular frequency can be reduced. Further, in recent years, it has been required to record and reproduce various kinds of disks by a single driving apparatus. In this case, a utilized rotation speed range of a spindle is likely spread. When rotating the spindle at such a wide utilized rotation speed range, there arises a problem, as an example, that it is difficult to entirely reduce the vibration of a frequency range of a constant width.

SUMMARY OF THE INVENTION

According to an aspect of the present invention, a disk driving apparatus includes a base chassis which mounts thereon a spindle motor to rotatably drive a disk, and a pickup device to at least record information on or reproduce information from the disk rotated by the spindle motor while moving in a radial direction of the disk. Preferably, the base chassis includes a plurality of dynamic vibration absorbers each having an elastic member fixed to the base chassis and a dynamic vibration absorption pendulum plate supported by the chassis through the elastic member, and the plurality of dynamic vibration absorbers have different resonance frequencies each other within a frequency range of vibration of the base chassis which is generated in a utilized rotation speed range of the spindle motor.

According to another aspect of the present invention, a method of manufacturing a disk driving apparatus for attaching a plurality of dynamic vibration absorbers each having a dynamic vibration absorption pendulum plate and an elastic member to support the dynamic vibration absorption pendulum plate to a base chassis of the disk driving apparatus, the base chassis mounting thereon a spindle motor to rotatably drive a disk and a pickup device to at least record information on or reproduce information from the disk rotated by the spindle motor while moving in a radial direction of the disk, the method includes obtaining frequency characteristics of vibration of the base chassis generated at a utilized rotation speed range of the spindle motor, attaching a first dynamic vibration absorber having a resonance frequency set based on the frequency characteristics thus obtained, further obtaining frequency characteristics of vibration of the base chassis generated at the utilized rotation speed range of the spindle motor, and attaching a second dynamic vibration absorber having a resonance frequency different from the resonance frequency of the first dynamic vibration absorber set based on the frequency characteristics further obtained.

BRIEF DESCRIPTION OF THE DRAWINGS

FIGS. 11A and 11B are plan view and a sectional view of an elastic member for showing the configuration of the elastic member;

FIG. 12 is a schematic sectional diagram showing the disk driving apparatus according to another embodiment of the invention;

DETAILED DESCRIPTION OF THE INVENTION

Figure 1:
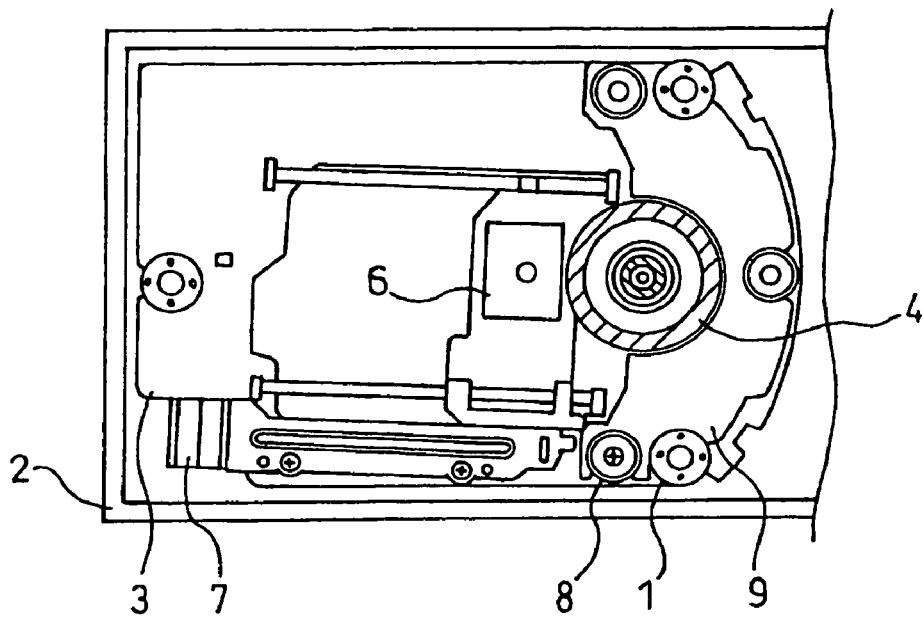
FIG. 1 is a plan view for explaining the configuration of a conventional disk driving apparatus.
Figure 2:
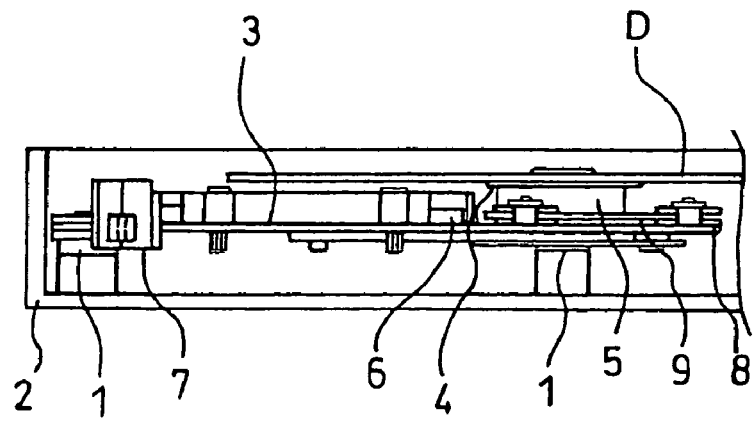
FIG. 2 is a sectional view for explaining the configuration of the conventional disk driving apparatus.

Embodiments of the disk driving apparatus and a manufacturing method of the disk driving apparatus according to the invention will be explained.

The disk driving apparatus according to the invention is arranged in a manner that the disk driving apparatus includes a base chassis which mounts thereon a spindle motor to rotatably drive a disk, and a pickup device to at least record information on or reproduce information from the disk rotated by the spindle motor while moving in a radial direction of the disk. Preferably, the base chassis includes a plurality of dynamic vibration absorbers each having an elastic member fixed to the base chassis and a dynamic vibration absorption pendulum plate supported by the chassis through the elastic member, and the plurality of dynamic vibration absorbers have different resonance frequencies each other within a frequency range of vibration of the base chassis which is generated in a utilized rotation speed range of the spindle motor.

According to the disk driving apparatus configured in this manner, the plurality of dynamic vibration absorbers are attached which vibrate at a phase in opposite to that of the base chassis and have different resonance frequencies within the frequency range of vibration of the base chassis which is generated in the utilized rotation speed range of the spindle motor. Thus, the vibrations of the different frequencies of the base chassis can be suppressed by the dynamic vibration absorbers, respectively.

Thus, in the various kinds of disk driving states at the time of recording information on and reproducing information from a disk, the vibration values near the frequencies to be problems can be reduced. Further, when the resonance frequencies of the plurality of dynamic vibration absorbers are set suitably, the maximum value of the vibration in the frequency range of the vibration of the base chassis which is generated in the utilized rotation speed range of the spindle motor can be reduced and also the vibration values can be reduced in the entirety of the frequency range.

Further, since the plurality of dynamic vibration absorbers are provided in a lamination manner on one of a major surface and a rear surface of the base chassis, the space of the base chassis can be used effectively.

Further, since the dynamic vibration absorption pendulum plates of the plurality of dynamic vibration absorbers are supported by the base chassis by the common elastic members, the number of parts can be reduced and the configuration of the apparatus can be simplified by sharing the parts between the plurality of dynamic vibration absorbers.

Further, since the plurality of dynamic vibration absorbers are provided on a major surface and a rear surface of the base chassis, respectively, the size of each of the dynamic vibration absorption pendulum plates can be made large and so the masses thereof can be made large. Thus, the vibration control effects of each of the dynamic vibration absorbers can be enhanced.

Further, since the plurality of dynamic vibration absorbers are provided on one of a major surface and a rear surface of the base chassis, the height of the dynamic vibration absorbers on the base chassis can be made low and so the apparatus can be made thin.

Further, since each of the dynamic vibration absorption pendulum plates has a symmetrical shape with respect to a moving direction of the pickup device, the base chassis can be stabilized at its weight balance in the plane direction hereof, and so the pickup device can record information in and reproduce information from a disk preferably.

Further, since the dynamic vibration absorption pendulum plates are disposed at symmetrical positions with respect to a moving direction of the pickup device, the base chassis can be stabilized at its weight balance in the plane direction hereof, and so the pickup device can record information in and reproduce information from a disk preferably.

The method of manufacturing a disk driving apparatus according to the invention is arranged in a manner that in the method of manufacturing a disk driving apparatus for attaching a plurality of dynamic vibration absorbers each having a dynamic vibration absorption pendulum plate and an elastic member to support the dynamic vibration absorption pendulum plate to a base chassis of the disk driving apparatus, the base chassis mounting thereon a spindle motor to rotatably drive a disk and a pickup device to at least record information on or reproduce information from the disk rotated by the spindle motor while moving in a radial direction of the disk, the method including obtaining frequency characteristics of vibration of the base chassis generated at a utilized rotation speed range of the spindle motor, attaching a first dynamic vibration absorber having a resonance frequency set based on the frequency characteristics thus obtained, further obtaining frequency characteristics of vibration of the base chassis generated at the utilized rotation speed range of the spindle motor, and attaching a second dynamic vibration absorber having a resonance frequency different from the resonance frequency of the first dynamic vibration absorber set based on the frequency characteristics further obtained.

According to the method of manufacturing the disk driving apparatus arranged in this manner, the plurality of dynamic vibration absorbers are attached which have different resonance frequencies and vibrate at a phase in opposite to that of the base chassis. Thus, it is possible to manufacture the disk driving apparatus in which the vibrations of the base chassis can be suppressed quite easily at the plurality of frequencies without complicating the configuration of the apparatus thereby to suppress the vibration in a wide range of the utilized frequency range.

EMBODIMENTS

Hereinafter, the disk driving apparatus and a manufacturing method of the disk driving apparatus according to embodiments of the invention will be explained in detail with reference to the accompanying drawings.

Figure 3:
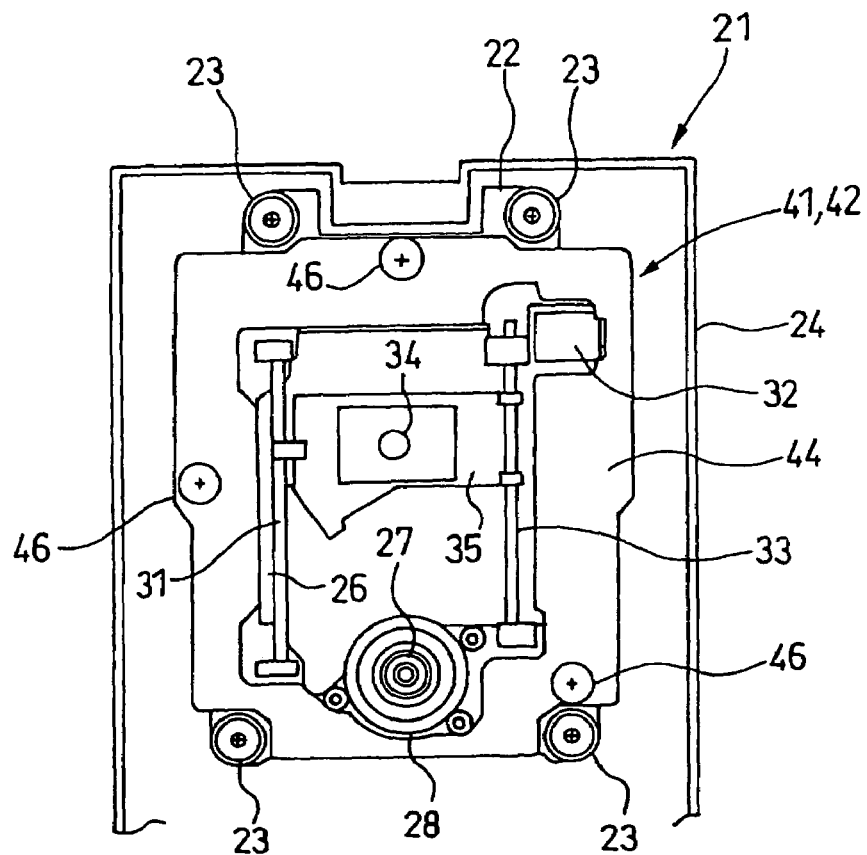
FIG. 3 is a plan view showing the disk driving apparatus according to an embodiment of the invention.
Figure 4:
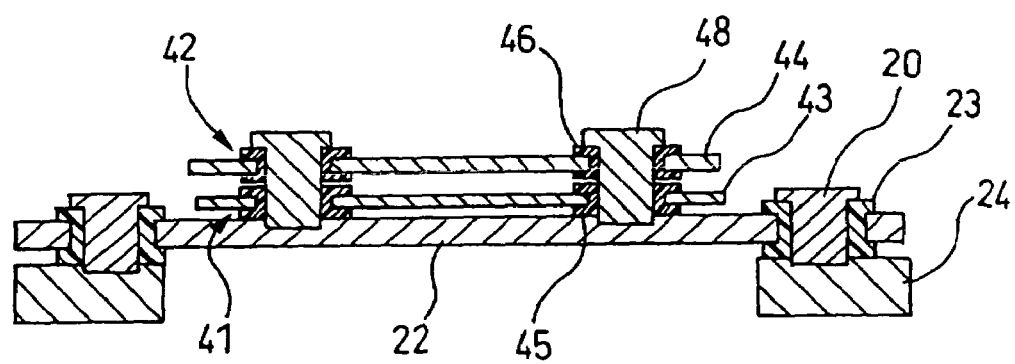
FIG. 4 is a schematic sectional diagram showing the disk driving apparatus according to the embodiment of the invention.
Figure 5:
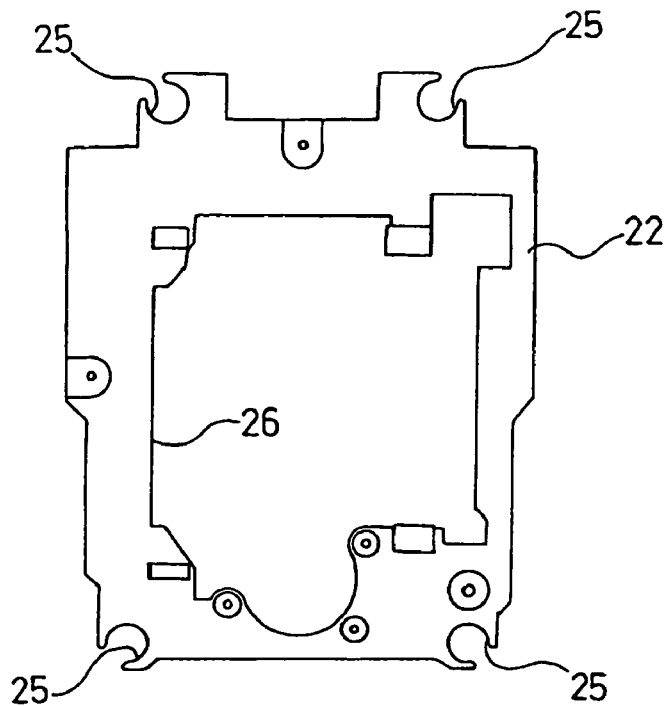
FIG. 5 is a plan view of a base chassis shown in FIG. 3.
Figure 6:
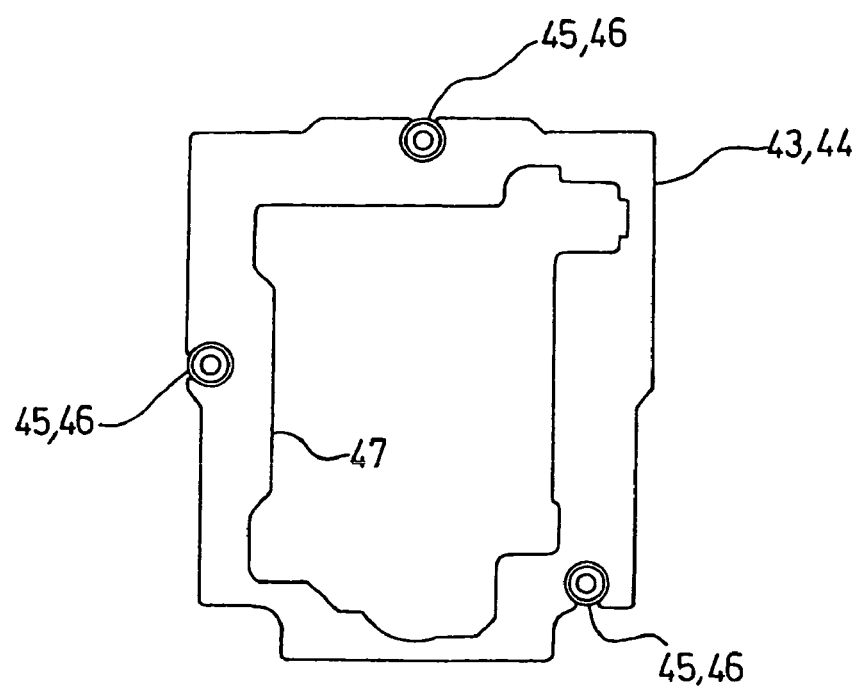
FIG. 6 is a plan view showing a dynamic vibration absorption pendulum plate shown in FIG. 3.

FIG. 3 is a plan view of the disk driving apparatus according to an embodiment of the invention, FIG. 4 is a schematic sectional diagram showing the disk driving apparatus, FIG. 5 is a plan view of a base chassis shown in FIG. 3, and FIG. 6 is a plan view showing a dynamic vibration absorption pendulum plate shown in FIG. 3.

As shown in FIGS. 3 and 4, a disk driving apparatus 21 is provided with a base chassis 22 within a casing 24 which constitutes an outer casing of the apparatus. The base chassis 22 is supported by the casing 24 through elastic members 23 each made of rubber etc., for example, which are fixed to the casing 24 by means of fixing members 20, respectively. As shown in FIG. 5, the base chassis 22 is formed in a frame shape, and attachment portions 25 to which the elastic members 23 are attached are formed at the outer periphery of the base chassis.

The base chassis 22 has an opening portion 26. A spindle motor 28 for rotating a turn table 27 is fixed at the one end side of the opening 26 of the base chassis. The turn table 27 is arranged in a manner that a disk is detachable therefrom. When the turn table 27 is rotated by the spindle motor 28, a disk attached to the turn table 27 rotates together with the turn table 27.

A guide rail 31 is provided at the one side portion of the opening 26 of the base chassis 22. A ball screw 33 rotated by a motor 32 is provided at the other side portion of the opening 26 of the base chassis. A bracket 35 having a pickup device 34 is supported by the guide rail 31 and the ball screw 33. Thus, when the ball screw 33 is rotated by the motor 32, the pickup device 34 moves in the radial direction along the surface of a disk attached to the turn table 27 together with the bracket 35. The pickup device 34 optically records and reproduces information while moving in the radial direction with respect to the surface of a disk being rotated by the spindle motor 28.

The base chassis 22 further includes a first dynamic vibration absorber 41 and a second dynamic vibration absorber 42 on the upper surface side thereof. The first dynamic vibration absorber 41 is constituted by a dynamic vibration absorption plate 43 and an elastic member 45, and the second dynamic vibration absorber 42 is constituted by a dynamic vibration absorption plate 44 and an elastic member 46. Each of the dynamic vibration absorption plates 43 and 44 is configured in a frame shape having an opening portion 47 as shown in FIG. 6. These dynamic vibration absorption plates 43, 44 are laminated on and supported by the base chassis 22 through the elastic members 45, 46 which are fixed to the base chassis 22 by means of fixing members 48.

The first dynamic vibration absorber 41 and the second dynamic vibration absorber 42 employ the elastic members 45, 46 having different elastic moduli, so that the first and second dynamic vibration absorbers have different resonance frequencies respectively. The first dynamic vibration absorber 41 and the second dynamic vibration absorber 42 are set to have different resonance frequencies vibrating at a phase in opposite to that of the base chassis 22 in the frequency range of the vibration of the base chassis 22 which is generated at the utilized rotation speed range of the spindle motor 28, respectively. The resonance frequencies of the first dynamic vibration absorber 41 and the second dynamic vibration absorber 42 can be set to desired values by suitably changing the masses of the dynamic vibration absorption plates 43, 44 or the elastic moduli (rigidities) of the elastic members 45, 46, respectively. Alternatively, the resonance frequencies of the first dynamic vibration absorber and the second dynamic vibration absorber can be set to desired values by suitably changing the shapes or disposed positions of the dynamic vibration absorption plates 43, 44 or the elastic members 45, 46, respectively.

The explanation will be made as to the case where the first dynamic vibration absorber 41 and the second dynamic vibration absorber 42 are attached to manufacture the disk driving apparatus 21.

First, the frequency of the vibration of the base chassis 22 generated at the utilized rotation speed range of the spindle motor 28 is obtained. Then, the frequency characteristics of the vibration values of the vibration generated at the base chassis 22 in the vibration frequency range is obtained. The vibration values can be evaluated by using the acceleration values or speeds. In place of obtaining the frequency characteristics of the actual vibration values, the frequency response function etc. of the vibration may be obtained as the frequency characteristics. As a method of obtaining the frequency characteristics of the vibration of the base chassis 22, instead of examining an actual machine to measure the vibration, it is possible to obtain the frequency characteristics by preparing the numerical model of the base chassis 22 through the finite element method etc. to dynamically analyze the model.

Next, the first dynamic vibration absorber 41 is attached which is set to have a resonance frequency at or near the frequency at which the vibration is to be reduced, based on the frequency characteristics thus obtained. Thus, near the resonance frequency of the first dynamic vibration absorber 41, the base chassis 22 and the dynamic vibration absorption plate 43 vibrate at opposite phases to each other in the inner surface direction of the base chassis 22, whereby the vibration of the base chassis 22 can be reduced due to the action of cancellation of these vibrations to each other.

Next, in a state where the first dynamic vibration absorber 41 is attached to the base chassis 22, the frequency characteristics of the vibration of the base chassis 22 is obtained again in the frequency range of the vibration of the base chassis 22 which is generated at the utilized rotation speed range of the spindle motor 28. Then, the second dynamic vibration absorber 42 is attached which is set to have a resonance frequency at or near the frequency at which the vibration is to be further reduced, based on the frequency characteristics thus obtained again. Since the first dynamic vibration absorber 41 is attached already, the vibration of the base chassis 22 is reduced at least at a portion of the utilized frequency range. Thus, the resonance frequency of the second dynamic vibration absorber 42 is set to a value particularly desired to be reduced within the frequencies other than the resonance frequency of the first dynamic vibration absorber 41. Therefore, the vibrations of the different frequencies of the base chassis 22 can be suppressed by the first dynamic vibration absorber 41 and the second dynamic vibration absorber 42.

Figure 7:
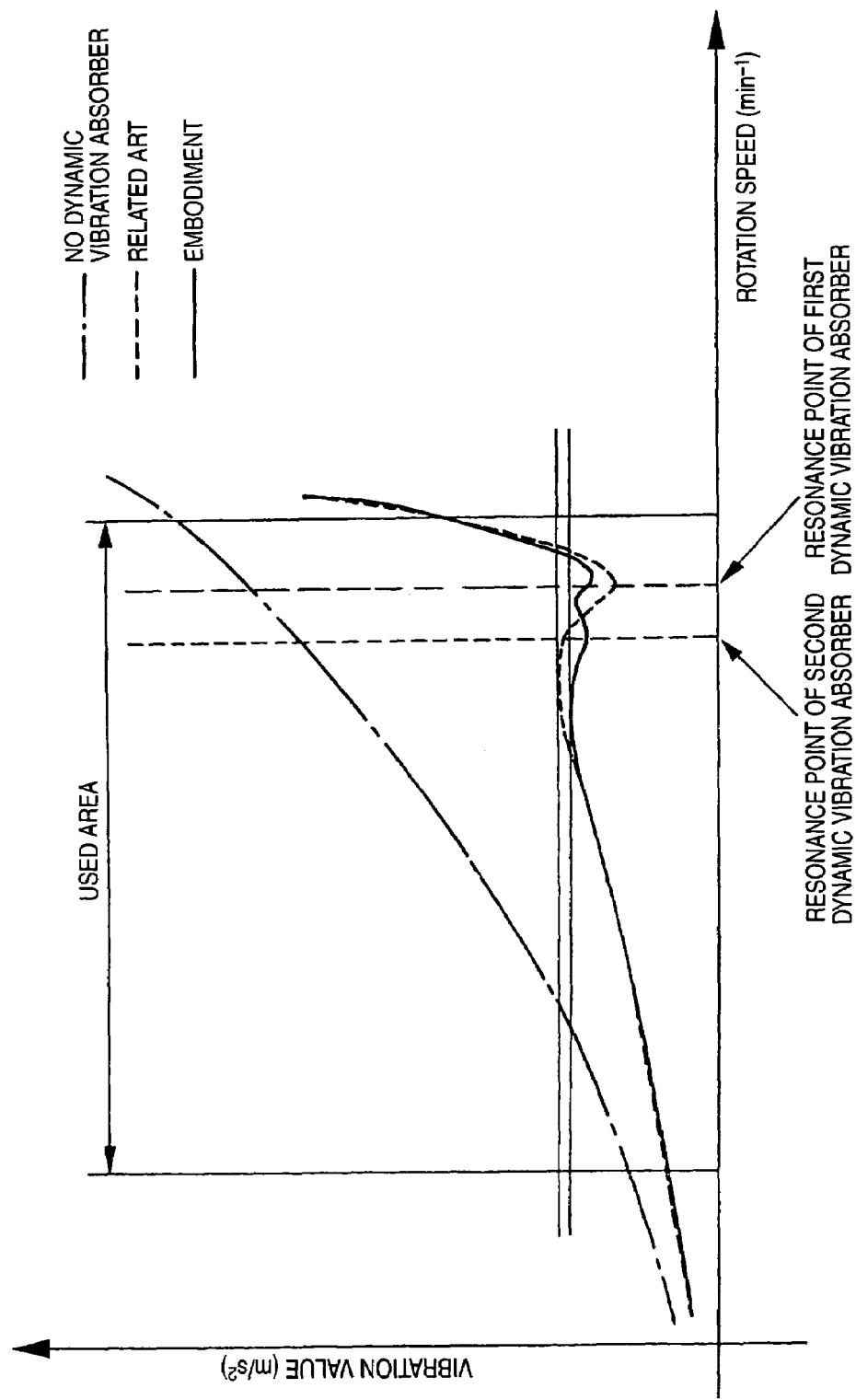
FIG. 7 is a graph showing the frequency characteristics of the vibration of the base chassis generated at the utilized rotation speed range of the spindle motor.

FIG. 7 is a graph showing the frequency characteristics of the vibration of the base chassis 22 generated at the utilized rotation speed range of the spindle motor 28. The vibration values shown in the ordinate in this graph represent acceleration values of the base chassis 22.

As shown in FIG. 7, according to the conventional apparatus having only the first dynamic vibration absorber 41, the vibration of the main frame is reduced as compared with the case where no dynamic vibration absorber is attached. In contrast, according to the embodiment of the invention in which the first dynamic vibration absorber 41 and the second dynamic vibration absorber 42 are attached, in addition that the vibration of the resonance frequency of the first dynamic vibration absorber 41 is reduced, the second dynamic vibration absorber 42 can reduce the vibration of the frequency which is lower than the resonance frequency of the first dynamic vibration absorber 41 and at which the vibration value is larger than that at the resonance frequency of the first dynamic vibration absorber.

As explained above, according to the disk driving apparatus 21 of the embodiment, there are attached the first dynamic vibration absorber 41 and the second dynamic vibration absorber 42 which have different resonance frequencies at which the first and second dynamic vibration absorbers vibrate at the phase in opposite to that of the base chassis 22 within the frequency range of the vibration of the base chassis 22 generated in the utilized rotation speed range of the spindle motor 28. Thus, the vibrations of the different frequencies of the base chassis 22 can be effectively suppressed by the first dynamic vibration absorber 41 and the second dynamic vibration absorber 42.

Thus, in the frequency range of the vibration of the base chassis 22 generated in the utilized rotation speed range of the spindle motor 28, the vibration of the base chassis 22 can be reduced in a plurality of the desired frequencies or the entire frequency range.

The resonance frequencies of the first dynamic vibration absorber 41 and the second dynamic vibration absorber 42, which can be adjusted to the frequencies desired to be reduced, respectively, are preferably primary resonance frequencies which excite the primary vibration modes in the flat surface directions of the first dynamic vibration absorber 41 and the second dynamic vibration absorber 42, respectively. In the secondary vibration modes in the flat surface directions of the first dynamic vibration absorber 41 and the second dynamic vibration absorber 42, the phases of the dynamic vibration absorption plates 43, 44 are considered to be in opposite to those of the primary vibration modes. Thus, when the secondary vibration modes are generated within the utilized frequency range, the vibration of the base chassis 22 may be amplified at the frequencies. Therefore, it is desirable that only the primary resonance frequencies of the first dynamic vibration absorber 41 and the second dynamic vibration absorber 42 exist within the utilized frequency range.

Further, as shown in FIGS. 3 and 6, since the dynamic vibration absorption plates 43, 44 of the first dynamic vibration absorber 41 and the second dynamic vibration absorber 42 are configured almost symmetrically with respect to the moving direction (the elevational direction in the figure) of the pickup device 34. Thus, the base chassis 22 can be stabilized at its weight balance in the plane direction hereof, and so the pickup device 34 can record information in and reproduce information from a disk preferably.

According to the manufacturing method of the disk driving apparatus 21, there are attached the first dynamic vibration absorber 41 and the second dynamic vibration absorber 42 having different resonance frequencies which vibrate at the phase in opposite to that of the base chassis 22. Thus, the disk driving apparatus can be manufactured in which the vibrations of the base chassis 22 at the plurality of frequencies can be suppressed quite easily without complicating the configuration of the apparatus thereby to suppress the vibration in a wide range within the utilized frequency range.

Although, in the aforesaid embodiment, the two dynamic vibration absorbers 41, 42 are attached to the base chassis 22, the number of the dynamic vibration absorbers attached to the base chassis 22 is not limited to two and may be three or more. When three or more dynamic vibration absorbers attached to the base chassis, the vibration of the base chassis 22 can be reduced at further more number of frequencies.

Further, the disposed positions and shapes of the dynamic vibration absorption plates 43, 44 and the shapes of the elastic members 45, 46 of the first dynamic vibration absorber 41 and the second dynamic vibration absorber 42 are not limited to those of the aforesaid embodiment.

Next, the explanation will be made as to another embodiment of the disk driving apparatus 21 in which the disposed positions and shapes of the dynamic vibration absorption plates 43, 44 and the shapes of the elastic members 45, 46 of the first dynamic vibration absorber 41 and the second dynamic vibration absorber 42 are different from the aforesaid embodiment.

Figure 8:
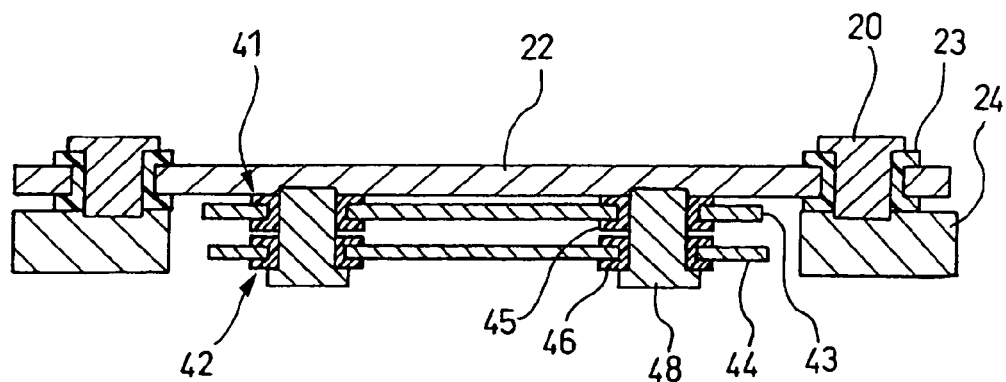
FIG. 8 is a schematic sectional diagram showing the disk driving apparatus according to another embodiment of the invention.

A disk driving apparatus shown in FIG. 8 is arranged in a manner that a first dynamic vibration absorber 41 and a second dynamic vibration absorber 42 are supported at the rear surface of a base chassis 22. In this case, the space of the base chassis 22 on the rear surface side thereof can be used effectively.

Figure 9:
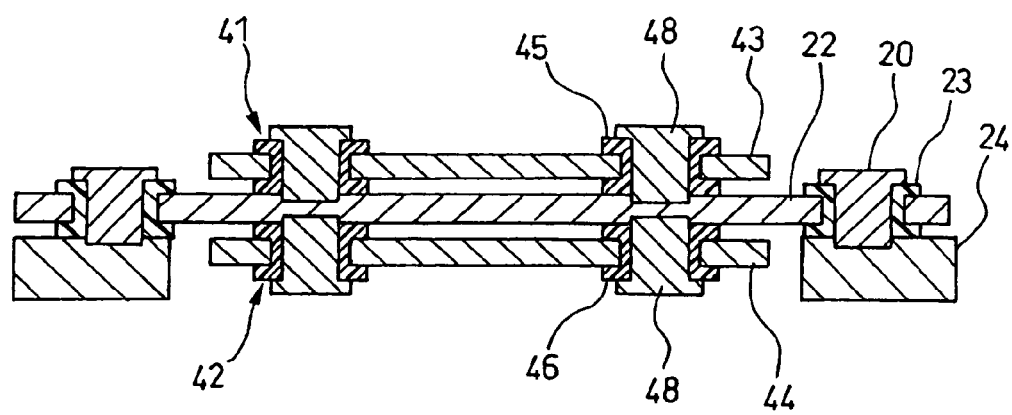
FIG. 9 is a schematic sectional diagram showing the disk driving apparatus according to another embodiment of the invention.

A disk driving apparatus shown in FIG. 9 is arranged in a manner that a first dynamic vibration absorber 41 is supported on the major surface side of a base chassis 22 and a second dynamic vibration absorber 42 is supported on the rear surface side of the base chassis 22. In this case, the masses of the dynamic vibration absorbers 41, 42 can be made large by enlarging the sizes of the dynamic vibration absorption plates 43, 44 of the first dynamic vibration absorber 41 and the second dynamic vibration absorber 42, whereby the vibration damping effects by the first dynamic vibration absorber 41 and the second dynamic vibration absorber 42 can be enhanced.

Figure 10:
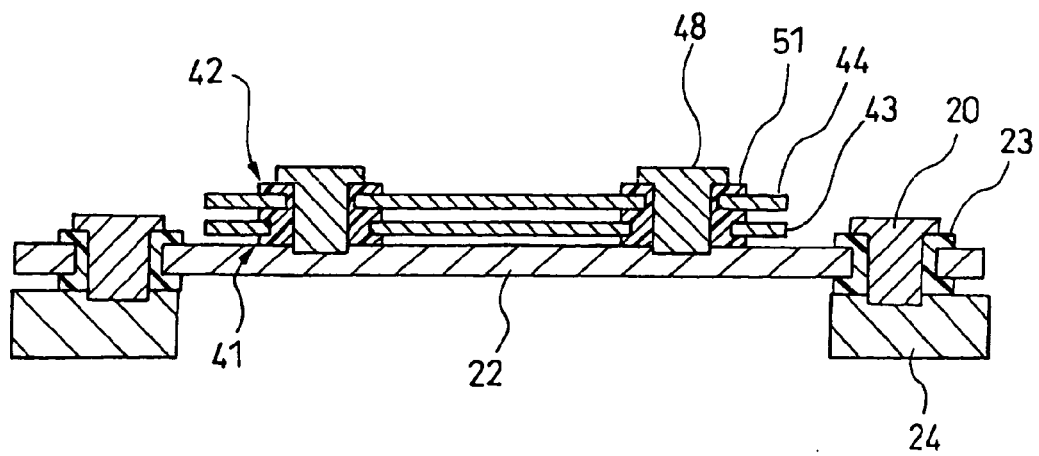
FIG. 10 is a schematic sectional diagram showing the disk driving apparatus according to another embodiment of the invention.

A disk driving apparatus shown in FIG. 10 is arranged in a manner that dynamic vibration absorption plates 43, 44 are supported by a single elastic member 51 at each of the supporting potions for a base chassis 22. In this case, as shown in FIGS. 11A and 11B, the diameters of the elastic member 51 at which the dynamic vibration absorption plates 43, 44 are attached are differentiated, whereby the resonance frequencies of the dynamic vibration absorption plates 43, 44 can be differentiated. According to such a configuration, the dynamic vibration absorption plates 43, 44 are supported by the common elastic member 51, so that the number of parts can be reduced and the configuration of the apparatus can be simplified.

A disk driving apparatus shown in FIG. 12 is arranged in a manner that each of dynamic vibration absorption plates 43, 44 is formed in a U-shape in a plan view and these dynamic vibration absorption pendulum plates are disposed in a lamination manner at the opposite side of a turn table 27 on a base chassis 22. The dynamic vibration absorption plates 43, 44 may be arranged to have the same shape.

Figure 13:
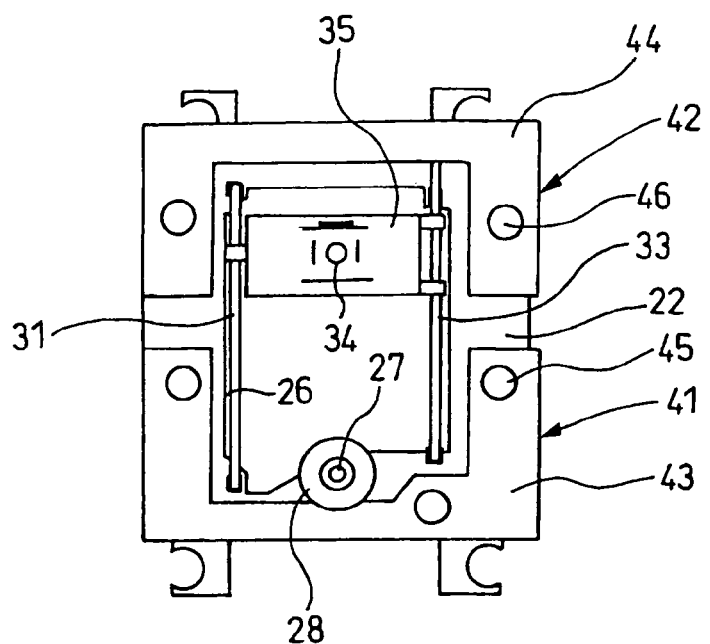
FIG. 13 is a schematic sectional diagram showing the disk driving apparatus according to another embodiment of the invention.
Figure 14:
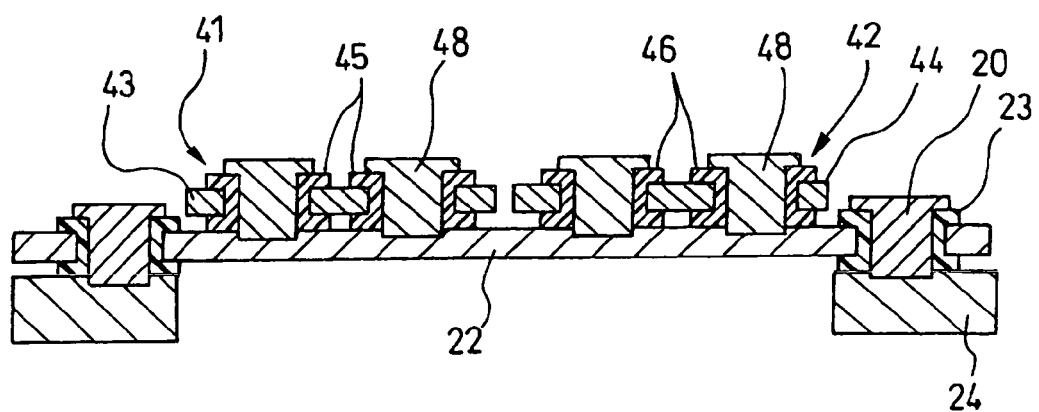
FIG. 14 is a schematic sectional diagram showing the disk driving apparatus according to another embodiment of the invention.

A disk driving apparatus shown in FIGS. 13 and 14 is arranged in a manner that each of dynamic vibration absorption plates 43, 44 is formed in a U-shape in a plan view and the dynamic vibration absorption pendulum plates 43, 44 are disposed at a turn table 27 side and a side opposite to the turn table 27 side on the same surface side of a base chassis 22, respectively. Since the dynamic vibration absorption plates 43, 44 are disposed on the same surface side of the base chassis 22, the heights of a first dynamic vibration absorber 41 and a second dynamic vibration absorber 42 on the base chassis 22 can be made low and so the apparatus can be made thin.

Figure 15:
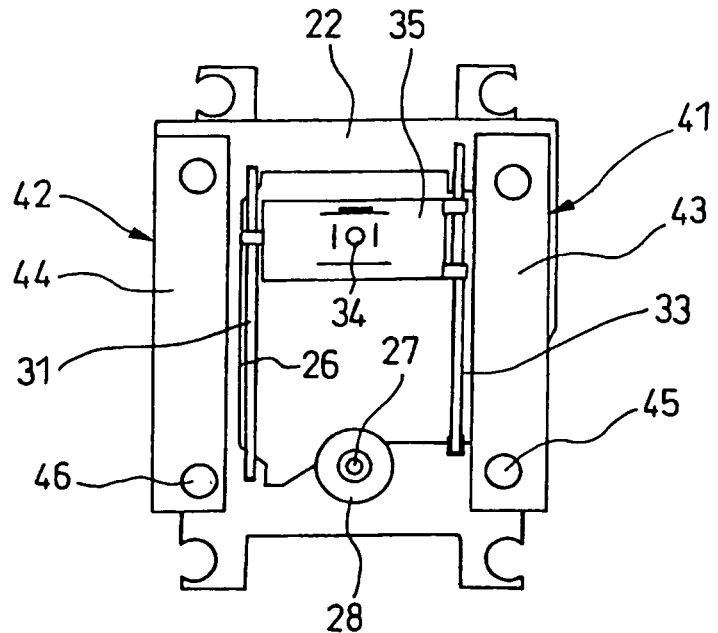
FIG. 15 is a schematic sectional diagram showing the disk driving apparatus according to another embodiment of the invention.

A disk driving apparatus shown in FIG. 15 is arranged in a manner that each of dynamic vibration absorption plates 43, 44 is formed in a long sheet shape, and these dynamic vibration absorption plates 43, 44 are disposed symmetrically on the upper surfaces at the both side portions of a base chassis 22 along the moving direction (longitudinal direction in the figure) of a pickup device 34, respectively. In this case, the heights of a first dynamic vibration absorber 41 and a second dynamic vibration absorber 42 on the base chassis 22 can be made low and so the apparatus can be made thin.

Further, since the dynamic vibration absorption plates 43, 44 of the first dynamic vibration absorber 41 and the second dynamic vibration absorber 42 are disposed symmetrically with respect to the moving direction of the pickup device 34, the weight balance of the base chassis 22 can be stabilized in the plane direction thereof. Thus, the pickup device 34 can record information in and reproduce information from a disk preferably.

Figure 16:
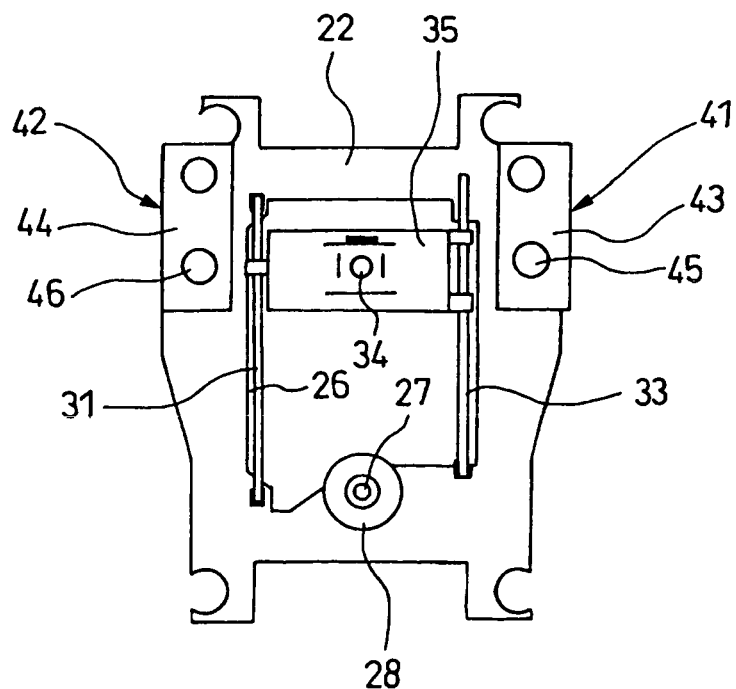
FIG. 16 is a schematic sectional diagram showing the disk driving apparatus according to another embodiment of the invention.

A disk driving apparatus shown in FIG. 16 is arranged in a manner that each of dynamic vibration absorption plates 43, 44 is formed in a small-sized rectangular shape in a plan view and these dynamic vibration absorption pendulum plates 43, 44 are disposed at the opposite side of a turn table 27 on the upper surface at the both side portions of a base chassis 22. The dynamic vibration absorption plates 43, 44 are disposed symmetrically on the upper surfaces at the both side portions of the base chassis 22 along the moving direction of the pickup device 34.

In this case, also, the heights of a first dynamic vibration absorber 41 and a second dynamic vibration absorber 42 on the base chassis 22 can be made low and so the apparatus can be made thin. Further, since the small-sized dynamic vibration absorption plates 43, 44 are employed, the occupancy ratio of the dynamic vibration absorption plates 43, 44 can be made small, whereby the apparatus can be made thin and miniaturized.

Furthermore, since the dynamic vibration absorption plates 43, 44 of the first dynamic vibration absorber 41 and the second dynamic vibration absorber 42 are disposed symmetrically with respect to the moving direction of the pickup device 34, the weight balance of the base chassis 22 can be stabilized in the plane direction thereof. Thus, the pickup device 34 can record information in and reproduce information from a disk preferably.

What is claimed is:

1. A disk driving apparatus comprising:
   a casing;
   a base chassis which mounts thereon a spindle motor to rotatably drive a disk, and a pickup device to at least record information on or reproduce information from the disk rotated by the spindle motor while moving in a radial direction of the disk, wherein
   the base chassis is fixed to the casing and positioned between the spindle motor mounted thereon and the casing, with the spindle motor being mounted at one end of the base chassis and the pickup device being configured to move over the base chassis,
   the base chassis includes a plurality of dynamic vibration absorbers each having an elastic member fixed to the base chassis and a dynamic vibration absorption pendulum plate supported by the chassis through the elastic member, and
   the plurality of dynamic vibration absorbers have different resonance frequencies from each other within a frequency range of vibration of the base chassis which is generated in a utilized rotation speed range of the spindle motor.

2. The disk driving apparatus according to claim 1, wherein
   the plurality of dynamic vibration absorbers are provided in a lamination manner on one of a major surface and a rear surface of the base chassis.

3. The disk driving apparatus according to claim 2, wherein
   the dynamic vibration absorption pendulum plates of the plurality of dynamic vibration absorbers are supported by the base chassis through a common elastic member.

4. The disk driving apparatus according to claim 1, wherein
   the plurality of dynamic vibration absorbers are provided on a major surface and a rear surface of the base chassis, respectively.

5. The disk driving apparatus according to claim 1, wherein
   the plurality of dynamic vibration absorbers are provided in the same plane on one of a major surface and a rear surface of the base chassis.

6. The disk driving apparatus according to claim 1, wherein
   the dynamic vibration absorption pendulum plate has a symmetrical shape with respect to a moving direction of the pickup device.

7. The disk driving apparatus according to claim 1, wherein
   the dynamic vibration absorption pendulum plates are disposed at symmetrical positions with respect to a moving direction of the pickup device.

* * * * *